US008599833B2

(12) United States Patent
Przybysz

(10) Patent No.: US 8,599,833 B2
(45) Date of Patent: Dec. 3, 2013

(54) TRANSPORT OF CONNECTIVITY STATUS INFORMATION IN AN IP MULTIMEDIA SUBSYSTEM NETWORK

(75) Inventor: Hubert Przybysz, Hägersten (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 710 days.

(21) Appl. No.: 12/446,646

(22) PCT Filed: Oct. 23, 2006

(86) PCT No.: PCT/EP2006/067657
§ 371 (c)(1),
(2), (4) Date: Apr. 22, 2009

(87) PCT Pub. No.: WO2008/049455
PCT Pub. Date: May 2, 2008

(65) Prior Publication Data
US 2009/0268723 A1 Oct. 29, 2009

(51) Int. Cl.
*H04L 12/66* (2006.01)
(52) U.S. Cl.
USPC .......................................................... 370/352
(58) Field of Classification Search
None
See application file for complete search history.

(56) References Cited

U.S. PATENT DOCUMENTS

| | | | | |
|---|---|---|---|---|
| 2004/0109459 A1* | 6/2004 | Madour et al. | ................. | 370/401 |
| 2005/0136926 A1* | 6/2005 | Tammi et al. | .............. | 455/435.1 |
| 2005/0259679 A1* | 11/2005 | Chowdhury et al. | ......... | 370/465 |
| 2006/0036741 A1* | 2/2006 | Kiss et al. | ..................... | 709/227 |
| 2008/0032691 A1* | 2/2008 | Kyzivat | ..................... | 455/435.1 |

OTHER PUBLICATIONS

Universal Mobile Telecommunications System (UMTS); Internet Protocol (IP) multimedia call control protocol based on Session Initiation Protocol (SIP) and Session Description Protocol (SOP); Stage 3 (3GPP TS 24.229 version 7.4.0 Release 7); ETSI TS 124 229" ETSI Standards, European Telecommunications Standards Institute, Sophia-Antipo, FR, vol. 3-CN1, No. V740, Jun. 2006, pp. 1-361, XP014035495 ISSN: 0000-0001 paragraph [5.2.5.2.] paragraph [5.2.8.1]—paragraph [5.2.8.1.4.] paragraph [A.2.1.4.3.] paragraph [A.2.1.4.8.] paragraph [A.2.1.4.10A.].

Ericsson: "IMS implications for notification of loss of signalling bearer, S2-063541" 3GPP SA WG2 Temporary Document. [Online] Oct. 17, 2006. pp. 1-6, XP002447707 Retrieved from the Internet: URL1:http://www.3gpp.org!ftp/tsQ-sa/WGZ-Arch/TSGS2-55_Busan/Docs/S2-063541.z1p> [retrieved on Aug. 22, 2007] paragraph [5.10.3.1.1.].

(Continued)

*Primary Examiner* — Minh-Trang Nguyen

(57) ABSTRACT

A system, method, and Proxy Call/Session Control Function (P-CSCF) for transporting signaling connectivity status information relating to a signaling connection between a terminal and the P-CSCF in an IP Multimedia Subsystem (IMS) network. In one embodiment, when the P-CSCF detects that the connectivity status has changed, the P-CSCF sends a SIP request such as a REGISTER request to a Serving CSCF (S-CSCF) indicating the new status. Alternatively, the registration event package of the terminal may be extended to include the connectivity status, and the P-CSCF then sends the status in a PUBLISH request. In an alternative embodiment, the P-CSCF maintains a new SIP event package. The S-CSCF subscribes to the SIP event package and the P-CSCF notifies the S-CSCF upon a change of connectivity status.

19 Claims, 3 Drawing Sheets

(56) References Cited

OTHER PUBLICATIONS www.3gpp.org / ftp/tsg_sa/WG2.....Arch/TSGS2_55-Busan/Docs/ 1I [Online] pp. 1-10. XP002447708 Retrieved from the Internet: URL:http://Www.3gpp.org/ftp/tsQ-sa/WG2-Arch/TSGS2-55_Busan/Docs/> [retrieved on Aug. 22, 2007] p. 2, line 16.

3GPP SA WG2: "3rd Generation Partnership Project; Technical Specification Group Services and Architecture; Optimisations and Enhancements for Realtime IMS communication (Release 7). TR 23.818 VO.7.0" 3GPP Standards, [Online] Sep. 2006, pp. 1-61. XP002447709 Retrieved from the Internet: URL:http://www.3gpp.org/ftp/Specs!archive/23_series/23.818/23818-070.Zip> [retrieved on Aug. 22, 2007] paragraph [007.]—paragraph [7.3.2.].

"Universal Mobile Telecommunications System (UMTS); Presence service; Architecture and functional description; Stage 2 (3GPP TS 23.141 version 7.2.0 Release 7)" ETSI Standards. European Telecommunications Standards Institute. Sophia-Antipo , FR. Sep. 2006, pp. 1-38, XP014035459 paragraph [4.3.6.] paragraphs [005.]-[6.1.1.] paragraphs [A.2.]-[A.2.3.4.].

"Digital cellular telecommunications system (Phase 2+); Universal Mobile Telecommunications System (UMTS); IP Multimedia Subsystem (IMS); Stage 2 (3GPP TS 23.228 version 7.5.0 Release 7); ETSI TS 123 228" ETSI Standards, European Telecommunications Standards Institute, Sophia-Antipo, FR, vol. 3-SA2, No. V750, Sep. 2006, pp. 1-216, XP014035472 ISSN: 0000-0001 paragraph [5.2]—paragraph [5.2.2.5.].

* cited by examiner

TRANSPORT OF CONNECTIVITY STATUS INFORMATION IN AN IP MULTIMEDIA SUBSYSTEM NETWORK

FIELD OF THE INVENTION

The invention relates to the status of a signalling link for IP Multimedia Subsystem (IMS) users. In particular, though not necessarily, it relates to a P-CSCF providing an indication that the link previously in use for SIP signalling between the user and the P-CSCF has been lost.

BACKGROUND

IP Multimedia (IPMM) is an example of a service that provides a dynamic combination of voice, video, messaging, data, etc., within the same session. By increasing the numbers of basic applications and the media which it is possible to combine, the number of services offered to the end users will grow, and the inter-personal communication experience will be enriched. This will lead to a new generation of personalised, rich multimedia communication services, e.g. peer-to-peer multimedia communication, IPTV etc.

These services can be based on the IP Multimedia Subsystem (IMS) architecture, which is the technology defined by the Third Generation Partnership Project (3GPP) to provide IP Multimedia services over mobile communication networks (3GPP TS 22.228, TS 23.228, TS 24.229, TS 29.228, TS 29.229, TS 29.328 and TS 29.329 Releases 5 to 7).

The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Other multimedia applications which can be used for media transmission and control include Real-time Transport Protocol and Real-time Transport Control Protocol (RTP/RTCP), Message Session Relay Protocol (MSRP), and Hyper Text Transfer Protocol (HTTP).

FIG. 1 illustrates schematically how the IMS fits into the mobile network architecture in the case of a 3GPP PS access network.

Call/Session Control Functions (CSCFs) operate as SIP proxies with the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

When a user wishes to access services provisioned by an IP Multimedia Subsystem (IMS) network, the user must typically register with his or her home network (this may occur at power-on of the user's device). An IMS/SIP client in the user equipment initiates the registration process by sending a SIP REGISTER message to the Serving Call Session Control Function (S-CSCF) allocated to the user within the home network. On receipt of the REGISTER message, the home network can allow or deny access to the IMS network by the user. A user's device or User Equipment (UE) communicates with the IMS via an access network, and the first point of contact for the user within the IMS is the P-CSCF. As part of the registration process the S-CSCF stores the contact address of the P-CSCF together with the address of the UE.

The signalling between the terminal and the P-CSCF is carried out using the access network. It is possible that the link for signalling information in the access network is lost. This may come about, for example, when a "through-air" signal is lost (for example when a user passes through a tunnel) or when a user moves into a congested cell. There is ongoing work in 3GPP R7 to ensure that the P-CSCF will receive an indication that the signalling link has been lost, for example via the Rx interface. However, no proposals have been made as to what the P-CSCF will do with this indication, except a simple P-CSCF generated de-registration. In other words, the P-CSCF would send a SIP REGISTER request to the S-CSCF for deregistration of the terminal. This is not generic or flexible enough to indicate the terminal's signalling connectivity status. The IMS currently contains no mechanism for transporting a loss of signalling link indication.

STATEMENT OF THE INVENTION

In accordance with a first aspect of the present invention there is provided a method of transporting signalling connectivity status information in an IP Multimedia Subsystem, the signalling connectivity status information identifying the state of a signalling connection between a terminal and a proxy node in a telecommunications network, the method comprising:

detecting at the proxy node that the signalling connectivity status has changed to a new status; and sending a SIP request from the proxy node to an IMS node of the IP Multimedia Subsystem, the SIP request indicating the new status.

The SIP request indicating the new connectivity status may be a REGISTER request, in which case a new header parameter indicating the connectivity status of the terminal is included in the request.

In general, the terminal will be registered with the IMS node when it originally logs on. In one embodiment, an initial signalling connectivity status may be registered by the proxy node and the IMS node during this initial registration. The new connectivity status (as detected when the connectivity status changes) may then be passed to the IMS node using a PUBLISH request.

In another embodiment the proxy node maintains a contact information document containing the signalling connectivity status. The IMS node may then subscribe to the contact information document. The proxy node may send a NOTIFY request to the IMS node indicating an initial signalling connectivity status when the IMS node first subscribes to the contact information document. A further NOTIFY request may then be sent to the IMS node when the connectivity status changes.

The proxy node is preferably a Proxy Call/Session Control Function. The IMS node may be a Serving Call/Session Control Function.

The signalling connectivity status may be defined as "connected", "disconnected", "uncertain" or "unknown", although it will be appreciated that any suitable status may be used. In one embodiment, the step of detecting at the proxy node that the signalling connectivity status has changed to a new status comprises detecting that the signalling connection between the terminal and the proxy node has been lost.

The IMS node may deregister the terminal in response to a notification that the signalling connection between the terminal and proxy node has been lost. Alternatively, the IMS node may take account of the signalling connectivity status between the terminal and the proxy node when routing traffic to the user's registered terminals.

In accordance with another aspect of the present invention there is provided a method of registering a terminal with an IMS node of an IP Multimedia Subsystem, comprising storing registration information at the IMS node, the registration information including the status of a signalling connection between the terminal and a proxy node.

In accordance with a yet further aspect of the present invention there is provided a method of registering a terminal with an IMS node of an IP Multimedia Subsystem, comprising sending a SIP REGISTER request to the IMS node, the SIP REGISTER request including a connectivity status parameter indicating the status of a signalling connection between the terminal and a proxy node.

In accordance with another aspect of the present invention there is provided a method of registering a terminal with an IMS node of an IP Multimedia Subsystem, comprising including a connectivity status parameter, which indicates the status of a signalling connection between the terminal and a proxy node, in a SIP registration event package.

In accordance with further aspect of the present invention there is provided a method of operating a proxy node in an IP Multimedia Subsystem, comprising creating a SIP contact information event package which monitors the status of a signalling connection between the proxy node and a terminal.

In accordance with another aspect of the present invention there is provided a method of operating a node of an IP Multimedia Subsystem, comprising subscribing to a SIP contact information event package at a proxy node, the SIP contact information event package including an indication of the status of a signalling connection between the proxy node and a terminal.

In accordance with another aspect of the present invention there is provided a Proxy Call/Session Control Function for use in an IP Multimedia Subsystem comprising:
input means for receiving information identifying the current signalling connectivity status of a terminal attempting to access the IP Multimedia Subsystem; and
output means for providing the current signalling connectivity status to a node of the IP Multimedia Subsystem.

In accordance with a further aspect of the invention there is provided a Proxy Call/Session Control Function for use in an IP Multimedia Subsystem arranged to create a SIP contact information event package which monitors the status of a signalling connection between the Proxy Call/Session Control Function and a terminal.

In accordance with another aspect of the present invention there is provided a system for transporting signalling connectivity status information in an IP Multimedia Subsystem, the signalling connectivity status information indicating the state of a signalling connection between a terminal and a proxy node in a telecommunications network, the system comprising:
input means at the proxy node for detecting that the signalling connectivity status has changed to a new status;
output means at the proxy node for sending a SIP request indicating the new status; and
an IMS node of the IP Multimedia Subsystem arranged to receive the SIP request and take appropriate action.

DETAILED DESCRIPTION OF THE PREFERRED EMBODIMENT

As discussed above, work has already been done to ensure that a P-CSCF receives information over the Rx interface that a terminal (UE) has been disconnected. The examples below provide mechanisms for ensuring that this information is passed on to the S-CSCF.

Figure 1:
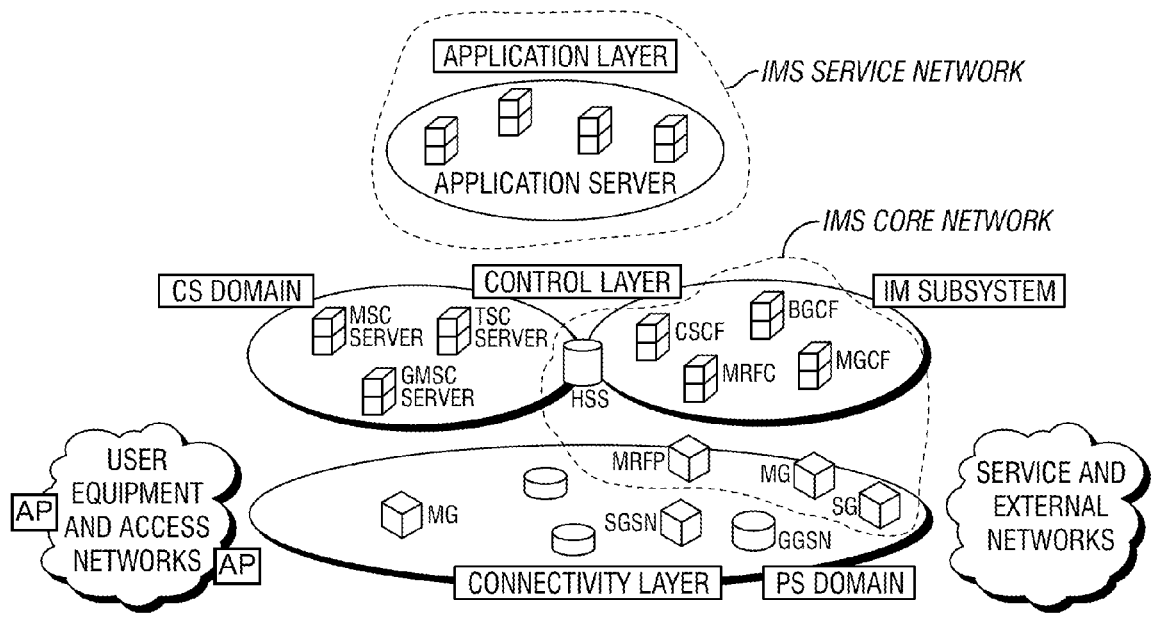
FIG. 1 illustrates schematically the architecture of an IP Multimedia Subsystem into a 3G mobile communications system.
Figure 2:
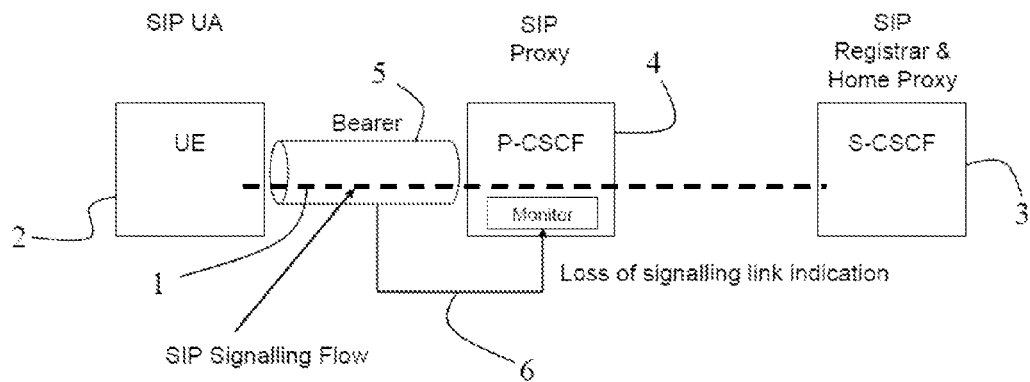
FIG. 2 is a schematic view of the signalling path between a SIP UE and S-CSCF.

FIG. 2 is a schematic representation of a signalling path 1 between a UE 2 and S-CSCF 3 via a P-CSCF 4. A link 5 is provided by the access network (not shown) of the UE. The P-CSCF includes a monitoring mechanism 6 which detects if the signalling path 1 from the UE is lost.

Figure 3:
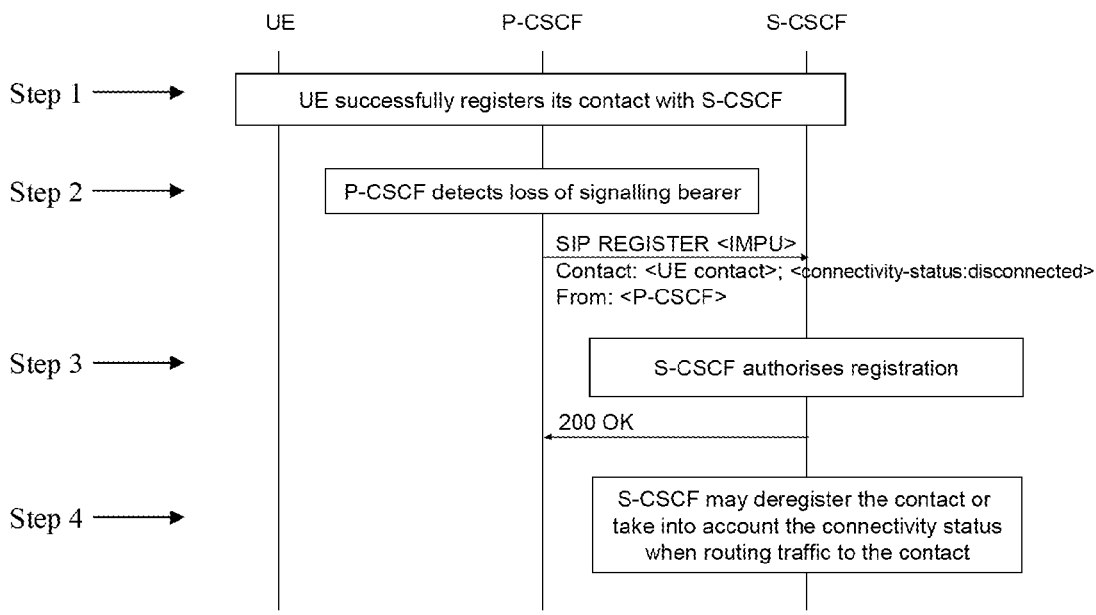
FIG. 3 illustrates a signalling sequence for ensuring that a S-CSCF is informed upon loss of a signalling bearer.

FIG. 3 illustrates a signalling sequence between the P-CSCF and S-CSCF which enables the UE's connectivity data to be recorded by the S-CSCF. In this example this is achieved by introducing a new contact header parameter indicating the UE's connectivity status. Suitable values for the status information could include: "connected", "disconnected", "uncertain", and "unknown". "Uncertain" status can be used when the connectivity is suspected of malfunctioning.

The signalling sequence is as follows:

Step 1: The UE registers its contact with the S-CSCF in a known manner. The UE and the P-CSCF subscribe to the registration event package to obtain notifications of registration information maintained by the S-CSCF.

Step 2: The P-CSCF detects loss of the signalling link between itself and the UE. This may be achieved, for example, by the P-CSCF receiving such an indication on the Rx interface. The P-CSCF sends a REGISTER request to the S-CSCF. The REGISTER request includes the UE's contact address, together with a new contact header parameter. The new parameter contains details of the contact connectivity status. In this example the status is "disconnected". The P-CSCF inserts its SIP URI address in the "From" header.

Step 3: When the S-CSCF receives the REGISTER request it establishes that the request has been generated by a trusted entity. One way of achieving this is to compare the address of the P-CSCF received in the request with the P-CSCF address stored earlier in the registration procedure in Step 1. Once the S-CSCF has confirmed that the P-CSCF is authorised, the S-CSCF returns a 200 OK response. This confirms that the "contact disconnected" status contained in the REGISTER request has been recorded.

Step 4: Having received information that the registered contact is disconnected, the S-CSCF may choose to deregister the contact or it may choose to store this information for further use when it receives traffic to be routed to the user's contact(s).

In other words, the signalling connectivity status of the UE is registered with the S-CSCF in a similar manner to the location when the user first makes contact, although it will be appreciated that the P-CSCF registers the signalling connectivity status, whereas when the user first makes contact it is the UE which registers its location.

Figure 4:
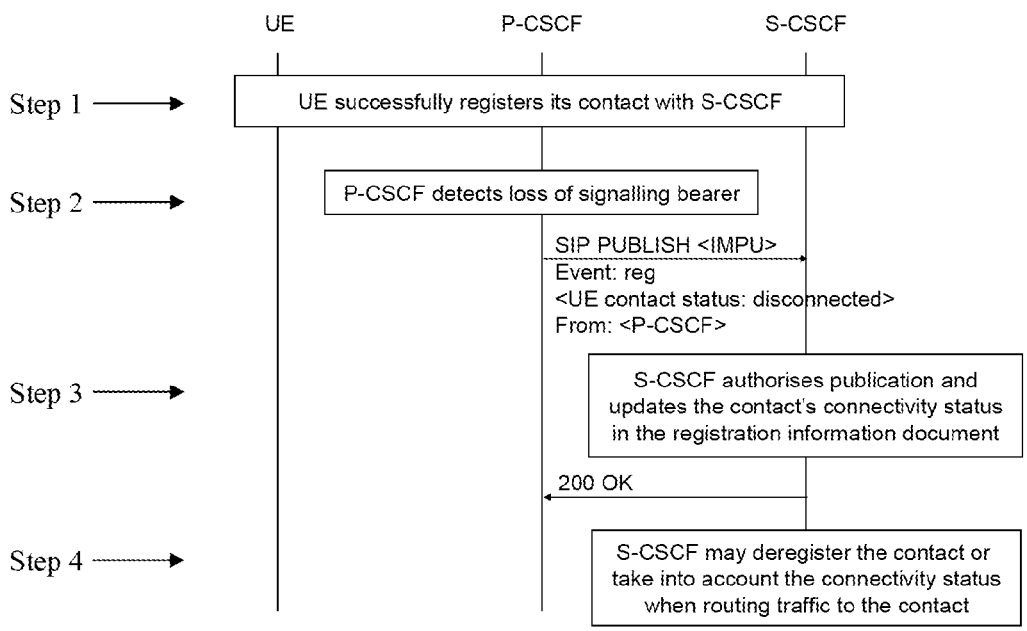
FIG. 4 illustrates an alternative signalling sequence for ensuring that a S-CSCF is informed upon loss of a signalling bearer.

An alternative signalling sequence for providing connectivity information to the S-CSCF is illustrated in FIG. 4. This alternative extends the definition of the Registration Event Package (RFC 3680) by adding optional contact connectivity status information to the contact information element of the registration information document. The connectivity status of the UE is included in the initial registration with the S-CSCF, in addition to location and identity. This can be achieved by the S-CSCF assuming that the initial signalling connectivity status is 'connected' since (and if it is known that) the initial registration takes place over the signalling bearer. Alternatively, the P-CSCF may provide the initial signalling connectivity to the S-CSCF using a SIP PUBLISH request. When the P-CSCF detects that the connectivity status has changed, this information is passed to the S-CSCF using a PUBLISH request. The S-CSCF updates its registration information in response to the information contained in the PUBLISH request. As before, suitable values for the status information could include: "connected", "disconnected", "uncertain", and "unknown". "Uncertain" status can be used when the connectivity is suspected of malfunctioning.

The signalling sequence is as follows:

Step 1: The UE registers its contact with the S-CSCF in a known manner. S-CSCF learns the signalling connectivity status during this initial registration.

Step 2: The P-CSCF detects loss of the signalling link between itself and the UE. As before, this may be achieved, for example, by the P-CSCF receiving such an indication on the Rx interface. The P-CSCF sends a PUBLISH request to the S-CSCF. The PUBLISH request includes a document containing the new contact connectivity status information. In this example the status is "disconnected". The P-CSCF inserts its SIP URI address in the "From" header.

Step 3: When the S-CSCF receives the PUBLISH request it establishes that the request has been generated by a trusted entity. One way of achieving this is to compare the address of the P-CSCF received in the request with the P-CSCF address stored earlier in the registration procedure in Step 1. Once the S-CSCF has confirmed that the P-CSCF is authorised, the S-CSCF returns a 200 OK response. This confirms that the "contact disconnected" status contained in the PUBLISH request has been recorded.

Step 4: Having received information that the registered contact is disconnected, the S-CSCF may choose to deregister the UE or it may choose to store this information for further use when it receives traffic to be routed to the user's contact(s).

This mechanism is general, as it allows entities other than the S-CSCF to obtain contact connectivity information by subscribing to the registration information maintained by the S-CSCF, which now includes this information.

In a further alternative, a new SIP event package is defined which enables the P-CSCF to deliver contact connectivity information. The SIP event notification framework (RFC 3265) is used. In this alternative, the P-CSCF maintains contact connectivity status information in a SIP Event Package with a new Contact Information Document. This allows other entities, such as the S-CSCF, to subscribe to this information and to obtain notifications on status changes.

Figure 5:
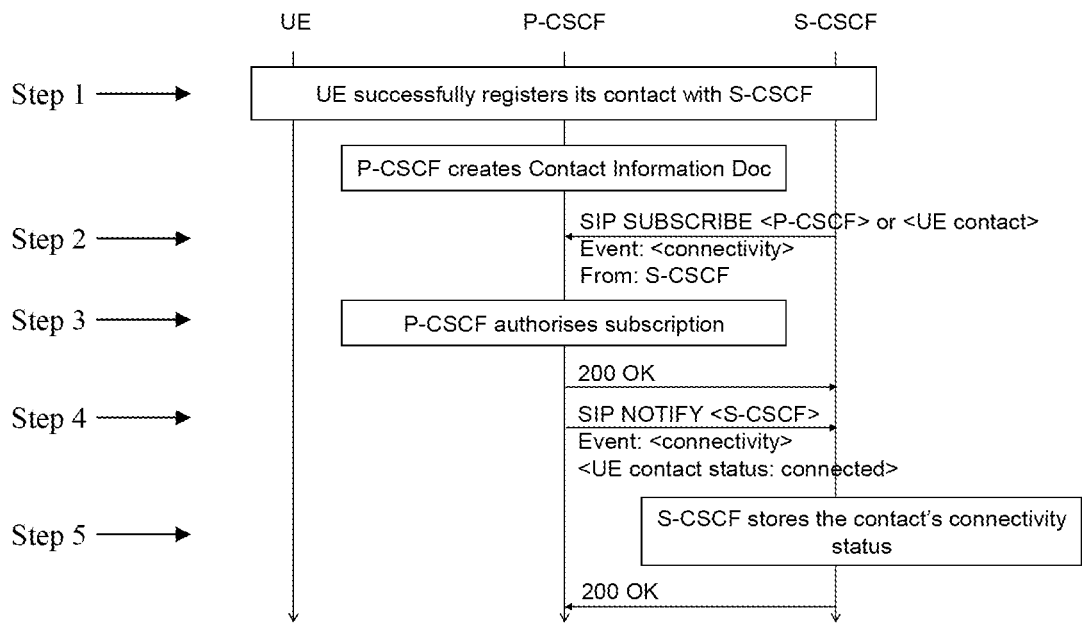
FIG. 5 illustrates a signalling sequence for delivering connectivity information to the S-CSCF.
Figure 6:
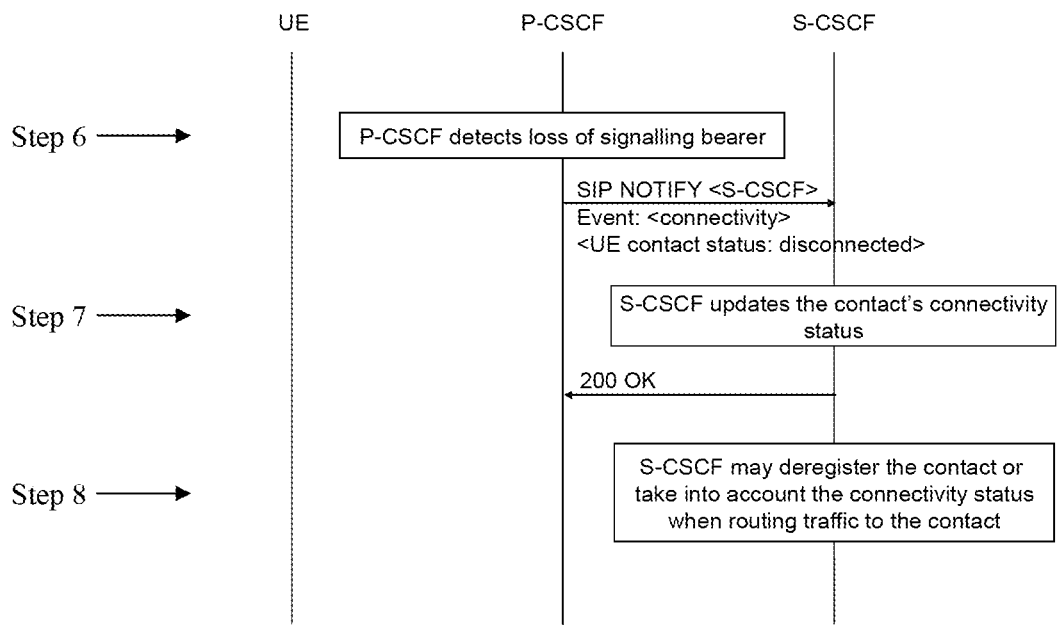
FIG. 6 illustrates a signalling sequence for notifying the S-CSCF upon loss of a signalling bearer.

The initial setup sequence is shown in FIG. 5 and is as follows:

Step 1: The UE registers its contact with the S-CSCF. During the registration procedure, the P-CSCF and S-CSCF store each other's addresses. They also store information regarding, and the status of, the initial contact between the UE and the P-CSCF. The UE and the P-CSCF subscribe to the registration event package to obtain notifications of registration information maintained by the S-CSCF. These are current standard 3GPP procedures. In addition, the P-CSCF creates a Contact Information Document with contact connectivity status information and may provide to the S-CSCF the SIP URI address of the created document as part of the registration procedure. The P-CSCF maintains this document for as long as it maintains the registration state of the contact.

Step 2: When the contact has been registered, the S-CSCF subscribes to the contact's connectivity status. This is achieved by sending a SIP SUBSCRIBE request to the P-CSCF, requesting the Contact Information Document of the registered contact.

Step 3: When the P-CSCF receives the SUBSCRIBE request it establishes that the request has been generated by a trusted entity. One way of doing this is to compare the address of the S-CSCF received in the request with the S-CSCF address stored during the registration procedure in Step 1. The P-CSCF stores the address of the S-CSCF as that of a subscriber to the Contact Information. Having authorised the S-CSCF as a trusted subscriber the P-CSCF responds with a 200 OK to the SUBSCRIBE request.

Step 4: The P-CSCF then sends a SIP NOTIFY request to the new subscriber (the S-CSCF), with the current Contact Information Document, in this example indicating that the contact is connected.

Step 5: When the S-CSCF receives the NOTIFY request it stores the Contact Information for future use, and responds with 200 OK.

It will be noted that the P-CSCF provides the SIP URI of the Contact Information Document during the registration.

If the signalling link is lost, this is detected, as before, by the P-CSCF (e.g. by receiving an indication on the Rx interface). The signalling sequence for conveying this information is illustrated in FIG. 5 and is as follows:

Step 6: When the P-CSCF detects loss of the signalling link between itself and the UE, the P-CSCF sends a SIP NOTIFY request to the S-CSCF. The NOTIFY request includes a changed Contact Information Document with the new contact connectivity status information. In this example this indicates that the contact is now disconnected.

Step 7: When the S-CSCF receives the NOTIFY request it updates the contact connectivity status information and returns a 200 OK response.

Step 8: Having received information that the registered contact is disconnected, the S-CSCF may choose to deregister the contact or it may choose to store this information for further use when it receives traffic to be routed to the user's contact(s). If the contact is deregistered, the S-CSCF's subscription to the connectivity status event is terminated.

This mechanism also allows entities other than the S-CSCF to obtain connectivity information for the contact by subscribing to the contact information maintained by the P-CSCF.

It will be appreciated that variations from the above described embodiments may still fall within the scope of the invention. For example, all of the embodiments above describe a situation where an explicit indication of loss of signalling link is received by the P-CSCF over the Rx interface. However, other mechanisms by which the P-CSCF is notified of the loss of signalling connectivity may be envisaged. For example, a lack of response from the UE after a certain period of time may be used. Alternatively an Internet Control Message Protocol (ICMP) message may be received from the IP transport network. Other mechanisms are also possible.

It will also be appreciated that all of the above described embodiments are concerned chiefly with the loss of signalling connection between the UE and P-CSCF. It is noted in each case that the S-CSCF may update the connectivity status for future use. If the connection is re-established, a system in accordance with the present invention may be used to convey this information to the S-CSCF so that it can again update its status. The invention is not limited to reporting a loss of connectivity between the UE and P-CSCF: it is concerned with reporting the status of the connection.

Furthermore, all of the examples describe transporting signalling connectivity status information from the P-CSCF to the S-CSCF. It will be appreciated that the invention may be used to transport this information from the P-CSCF to other nodes of the IMS core to take appropriate action.

The invention claimed is:

1. A method of transporting signalling bearer status information in an IP Multimedia Subsystem, the signalling bearer status information identifying a status of a signalling bearer between a terminal and a proxy node in a telecommunications network, the method comprising:
   detecting at the proxy node that the signalling bearer between the terminal and the proxy node has been lost;
   in response to detecting that the signalling bearer between the terminal and the proxy node has been lost, sending a Session Initiation Protocol (SIP) request from the proxy node to a Serving Call/Session Control Function (S-CSCF) of the IP Multimedia Subsystem, the SIP request indicating the signalling bearer status comprising loss of the signalling bearer;
   verifying by the S-CSCF that the SIP request was generated by a trusted entity;
   recording the signalling bearer status by the S-CSCF; and
   utilizing th recorded signalling bearer status by the S-CSCF to determine the handling of further traffic to be routed toward the terminal.

2. The method as claimed in claim 1, wherein the SIP request is a REGISTER request.

3. The method as claimed in claim 2, wherein the REGISTER request includes a header parameter indicating the signalling bearer status of the terminal.

4. The method as claimed in claim 1, wherein the SIP request is a PUBLISH request.

5. The method as claimed in claim 4, wherein the terminal is registered with the S-CSCF, and wherein an initial signalling bearer status is registered by the proxy node and the S-CSCF when the terminal is registered with the S-CSCF.

6. The method as claimed in claim 1, wherein the proxy node maintains a contact information document containing the signalling bearer status, and wherein the S-CSCF subscribes to the contact information document.

7. The method as claimed in claim 6, wherein, when the S-CSCF subscribes to the contact information document, the proxy node sends a SIP NOTIFY request to the S-CSCF indicating an initial signalling bearer status.

8. The method as claimed in claim 7, wherein the SIP request indicating the loss of the signalling bearer is also a NOTIFY request.

9. The method as claimed in claim 1, wherein the proxy node is a Proxy Call/Session Control Function.

10. A method in a Serving Call/Session Control Function (S-CSCF) of an IP Multimedia Subsystem for maintaining signalling bearer status information for a terminal, the method comprising:
    receiving registration information at the S-CSCF, the registration information including an initial status of a signalling bearer between the terminal and a proxy node;
    storing the registration information at the S-CSCF;
    receiving a notification from the proxy node indicating the status of the signalling bearer between the terminal and the proxy node has changed;
    storing at the S-CSCF, an updated signalling bearer status in response to the notification; and
    utilizing the updated signalling bearer status by the S-CSCF to determine the handling of further traffic to be routed toward the terminal.

11. A Proxy Call/Session Control Function (P-CSCF) for use in an IP Multimedia Subsystem, comprising:
    an input configured to receive information identifying an initial status of a signalling bearer between the P-CSCF and a terminal attempting to access the IP Multimedia Subsystem;
    an output configured to send the initial signalling bearer status to a Serving Call/Session Control Function (S-CSCF) of the IP Multimedia Subsystem; and
    a detector configured to detect that the status of the signalling bearer between the P-CSCF and the terminal has changed;
    wherein the output is further configured to send to the S-CSCF, a notification indicating the status of the signalling bearer between the P-CSCF and the terminal in response to detecting that the signalling bearer between the P-CSCF and the terminal has changed.

12. A system for transporting signalling bearer status information in an IP Multimedia Subsystem, the signalling bearer status information identifying a status of a signalling bearer between a terminal and a proxy node in a telecommunications network, the system comprising:
    a detector at the proxy node configured to detect that the signalling bearer between the proxy node and the terminal has changed;
    an output at the proxy node configured to send a Session Initiation Protocol (SIP) request indicating an updated status of the signalling bearer indicating the change detected by the detector; and
    a Serving Call/Session Control Function (S-CSCF) of the IP Multimedia Subsystem for receiving the SIP request and utilizing the updated status of the signalling bearer in traffic routing decisions.

13. The method as claimed in claim 10, wherein the step of receiving registration information at the S-CSCF includes receiving a SIP REGISTER request, the SIP REGISTER request including a signalling bearer status parameter indicating an initial status of the signalling bearer between the terminal and the proxy node.

14. The method as claimed in claim 10, wherein the step of receiving registration information at the S-CSCF includes receiving the registration information in a SIP registration event package.

15. The method as claimed in claim 10, wherein the step of receiving registration information at the S-CSCF includes receiving the registration information in a SIP contact information event package.

16. The Proxy Call/Session Control Function as claimed in claim 11, wherein the output is configured to create a SIP contact information event package which monitors the status of the signalling bearer between the P-CSCF and the terminal.

17. The method as claimed in claim 10, wherein the notification indicating that the status of the signalling bearer has changed indicates the status of the signalling bearer as one of connected, disconnected, uncertain, and unknown.

18. The Proxy Call/Session Control Function as claimed in claim 11, wherein the notification indicating the status of the signalling bearer between the P-CSCF and the terminal indicates one of connected, disconnected, uncertain, and unknown.

19. The system as claimed in claim 12, wherein the SIP request indicates the status of the signalling bearer between the proxy node and the terminal as one of connected, disconnected, uncertain, and unknown.

* * * * *

UNITED STATES PATENT AND TRADEMARK OFFICE
CERTIFICATE OF CORRECTION

PATENT NO. : 8,599,833 B2  Page 1 of 1
APPLICATION NO. : 12/446646
DATED : December 3, 2013
INVENTOR(S) : Przybysz It is certified that error appears in the above-identified patent and that said Letters Patent is hereby corrected as shown below:

On the Title Page, item (56), under "OTHER PUBLICATIONS", in Column 2, Line 13, delete "URL1:" and insert -- URL: --, therefor.

In the Specification:

In Column 5, Line 21, delete "S-CSCF" and insert -- The S-CSCF --, therefor.

In the Claims:

In Column 7, Line 25, in Claim 1, delete "th" and insert -- the --, therefor.

Signed and Sealed this
Eighth Day of July, 2014

Michelle K. Lee
*Deputy Director of the United States Patent and Trademark Office*